(12) United States Patent
DeSellem

(10) Patent No.: US 6,273,141 B1
(45) Date of Patent: Aug. 14, 2001

(54) VARIABLE RESISTANCE DEVICE FOR A HIGH PRESSURE AIR SUPPLY SYSTEM

(75) Inventor: James Frederick DeSellem, Lisbon, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 09/599,326

(22) Filed: Jun. 22, 2000

(51) Int. Cl.[7] ............................................. F15D 1/02
(52) U.S. Cl. ................................................. 138/46; 138/37
(58) Field of Search .................... 138/37, 45, 46; 366/341

(56) References Cited

U.S. PATENT DOCUMENTS

| | | | |
|---|---|---|---|
| 4,487,510 | * 12/1984 | Burrman et al. | 138/37 X |
| 4,506,991 | * 3/1985 | Hudson | 138/45 X |
| 4,619,138 | * 10/1986 | Ohnhaus | 138/37 X |
| 5,398,728 | * 3/1995 | Baumeister et al. | 138/37 |
| 5,971,604 | * 10/1999 | Linga et al. | 138/46 X |

* cited by examiner

*Primary Examiner*—Patrick Brinson
(74) *Attorney, Agent, or Firm*—Eric Marich

(57) ABSTRACT

A variable resistance device for use in a duct of a high pressure air supply system employs a rotatable butterfly damper locatable in the air supply system having a closed and an open position for variably restricting airflow through the air supply system. The butterfly damper is provided with apertures which permit air to flow through the butterfly damper even when it is in a closed position. The apertures are sized to provide a maximum resistance value at a minimum air flow rate in a closed position, a minimum resistance value at a maximum air flow rate in a 70% open position, and a nearly linear relationship between an angular rotation position of the butterfly damper and resistance.

9 Claims, 3 Drawing Sheets

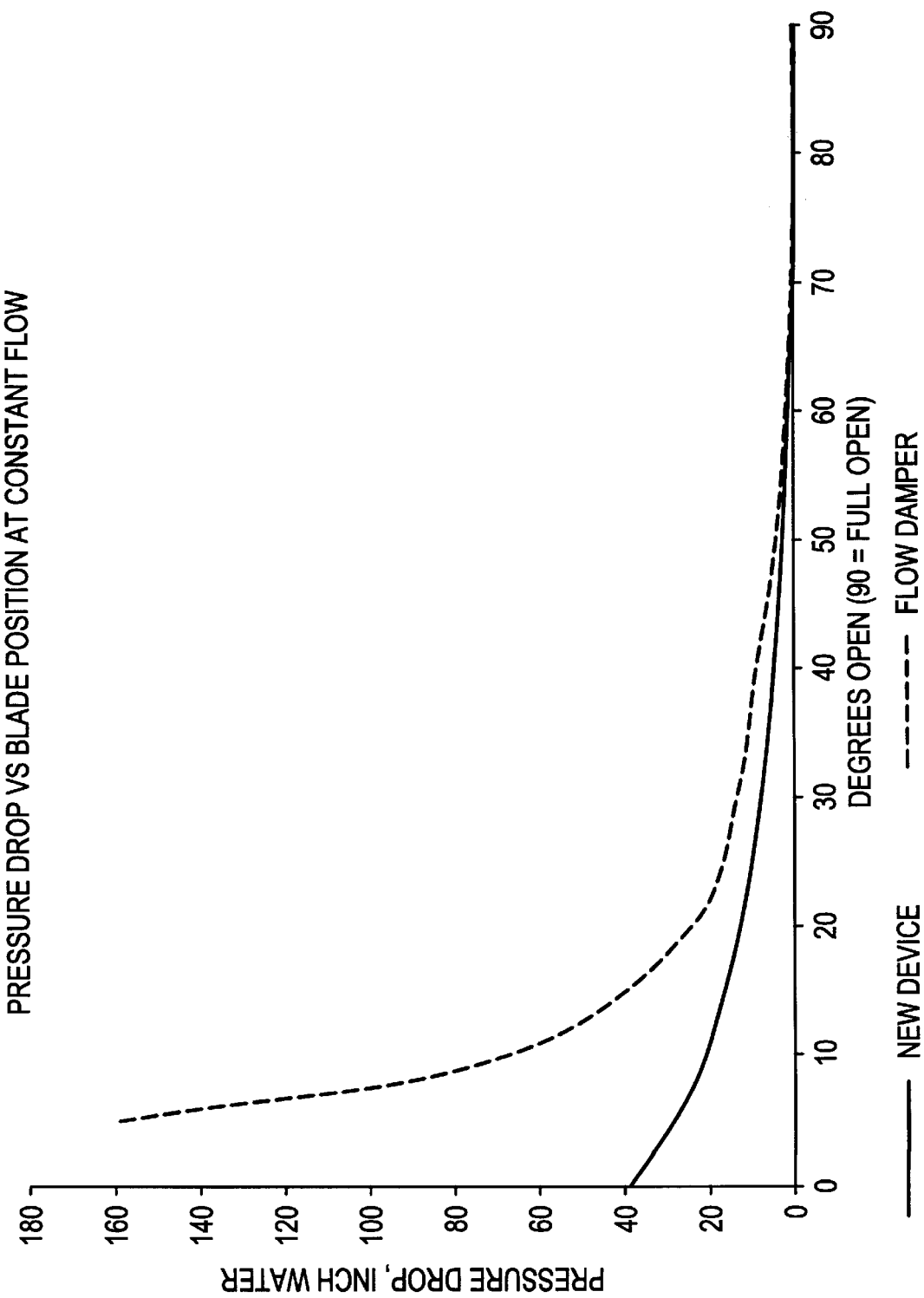

VARIABLE RESISTANCE DEVICE FOR A HIGH PRESSURE AIR SUPPLY SYSTEM

FIELD AND BACKGROUND OF THE INVENTION

The present invention relates generally to high-pressure, air supply systems such as those used in connection with fluidized bed boilers and, more particularly, to a variable resistance device for use in such systems for controlling the air flow therethrough at desired pressures.

Air supply systems employ an arrangement of ductwork and one or more fans to provide air at a desired delivery pressure and flow rate. In many cases, the fan installed in the air supply system has a larger flow rate capacity and/or delivery pressure than initially required so that it can accommodate a future operating condition. One such example would be a situation where a fan used to supply air for a boiler is sized for a higher boiler load condition, but the fan will be operated at a lower boiler load condition in the interim. In such situations, the fan must be stabilized so that it can operate at the reduced system load operating point corresponding to the reduced boiler load condition. This is usually accomplished by adding air resistance or pressure drop into the system, in lieu of making expensive fan modifications or replacing the fan itself. The most cost effective and common way to add such air resistance or pressure drop to an air supply system is to install a stationary perforated plate or a standard flow damper in the ductwork.

A situation arose in connection with a fluidized bed boiler system where additional resistance was needed to stabilize an oversized forced draft fan used to fluidize the bed. The forced draft fans used in such service are high static pressure fans (producing near 70 inches water column) and are designed to supply air to the bottom of the fluidized bed boiler. The high static pressure is required because these fans are responsible for the fluidization of the bed material. The other distinct aspect of this application is that this fan is required to change airflow as needed to match the boiler load while still maintaining sufficient static pressure to fluidize the bed material. As it turned out, the actual operating condition required less static pressure than had been estimated, and caused the fan to operate below its design static pressure curve in an unstable manner. The fan instability caused a surging effect at the fan that resulted in a combustion pulse in the boiler. This combustion pulse was, in turn, amplified in strength more than ten times. This amplification was believed to be caused by the fluidized bed boiler geometry. On site testing confirmed that adding resistance to the air system stabilized the fan. Through this testing both a high and low airflow resistance parameter was developed. These resistance parameters were unique in that the high airflow condition required less resistance than the low flow condition.

Both stationary perforated plate and conventional flow damper schemes were explored and found inadequate for this application. The stationary perforated plate could not provide the desired resistance at both high and low airflows. The conventional flow damper was not able to offer stable operation at the low airflow condition. In fact, due to the inherent characteristics of a flow control device operated at more than 50% closed, it was very likely that a conventional flow damper could itself create a pressure fluctuation at the low airflow condition. What was needed was a device that could vary the resistance with airflow demands and provide stable operation at all airflow conditions. The present invention provides a solution to this unique problem.

SUMMARY OF THE INVENTION

The present invention solves the problem described above by providing a variable resistance device which can provide a desired resistance at a specific airflow rate. In its simplest form, the present invention is a variable resistance device which comprises a rotatable apertured or perforated plate which can be installed in a duct structure and rotated to various angular positions to give the required resistance at a specific flow. The device according to the invention is designed with specific operating parameters in mind. In particular, the device is designed to provide the maximum resistance value at the minimum flow in the closed position, the minimum resistance value at the maximum flow in the 70% open position, and most importantly, provides a nearly linear relationship between perforated plate angular opening position and resistance.

For the particular fluidized bed application described above, the variable resistance device was round to easily fit into the round ducts used in the fluidized bed air supply system but it will be appreciated by those skilled in the art that other cross-sections will work just as well. For example, the concept of the present invention will work equally well with a rectangular shaped, rotatable plate in a rectangular air duct. Similarly, the concept of the present invention is not limited to air service in fluidized bed boilers, and it can be applied to any air, flue gas or other gaseous conveying application requiring the introduction of variable resistance into the system conveying such fluids.

Accordingly, one aspect of the present invention is drawn to a variable resistance device for a high-pressure air system that is easily sealed within a duct of the system.

Another aspect of the present invention is drawn to a variable resistance device that provides a substantially linear relationship between plate position and resistance.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

BRIEF DESCRIPTION OF THE DRAWINGS

In the drawings:

FIG. 4 is a graph of the angular position at constant flow vs. pressure drop thereacross for the new device illustrated in FIGS. 2 and 3 and for a conventional flow damper.

DESCRIPTION OF THE PREFERRED EMBODIMENTS

Figure 1:
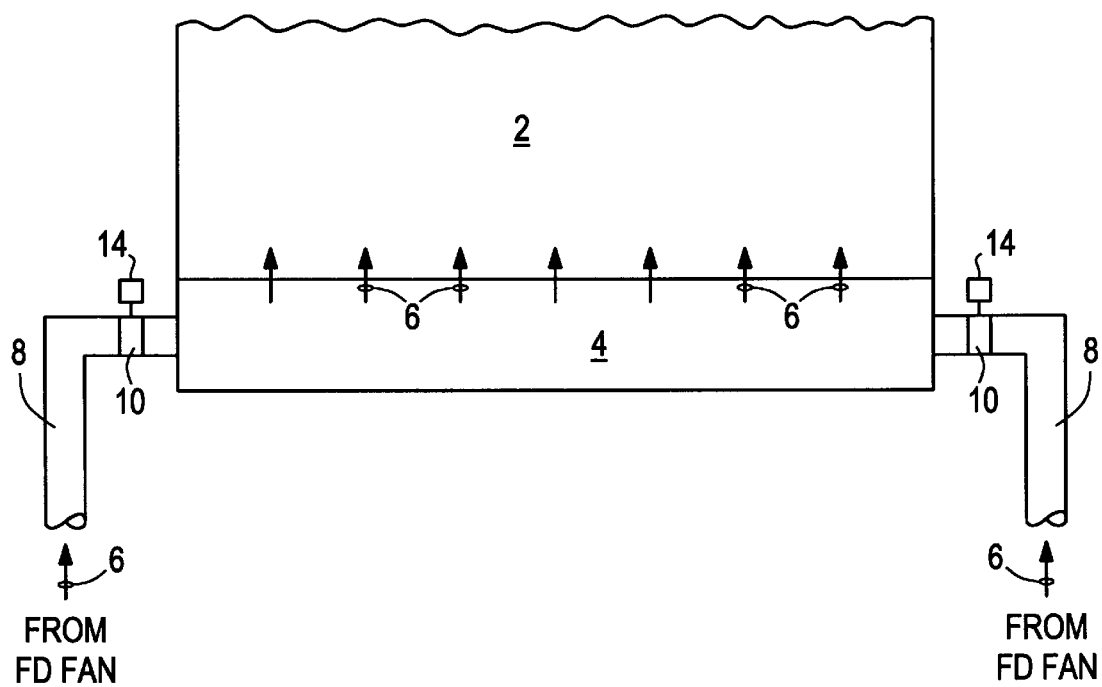
FIG. 1 is a schematic illustration of an air supply system for a fluidized bed boiler which would employ the variable resistance device according to the present invention.

Referring to the drawings generally, wherein like reference numerals designate the same or functionally similar elements throughout the several drawings, and to FIG. 1 in particular, there is illustrated a schematic representation of an air supply system for a fluidized bed boiler 2 which would employ the variable resistance device according to the present invention. The fluidized bed boiler 2 is provided with a windbox 4. Air 6 from a forced draft (FD) fan (not shown) is conveyed via one or more ducts 8 to the windbox 4. The air 6 is conveyed into the fluidized bed 2 to fluidize the material for combustion. Provided in the ducts 8, which may be circular or of other cross-sectional shapes, are variable resistance devices, generally designated 10, for providing a desired amount of resistance at a given airflow rate.

Digressing for a moment, the present inventor determined that the solution to the problem described above required a device which could vary the resistance with airflow demands and provide stable operation at all airflow conditions. The first mental iteration of such a device which occurred to the present inventor was a perforated plate that could be inserted or retracted into the air supply system ductwork in a manner similar to the action of a slidegate valve. However, this approach was quickly abandoned due to the problem of sealing such a device against leakage in a high static pressure application and the additional room needed externally of the ductwork to retract a plate of the necessary size. What was needed was a variable perforated plate that is sealably contained within the duct structure and which could somehow vary with the air flow at high pressures. This led to the concept of the present invention wherein the variable resistance device comprises an apertured damper which can be rotated from a "closed" position where the damper is substantially perpendicular to the flow in the duct (0° open), to an open position where the damper is substantially parallel to the flow in the duct (90° open).

Figure 2:
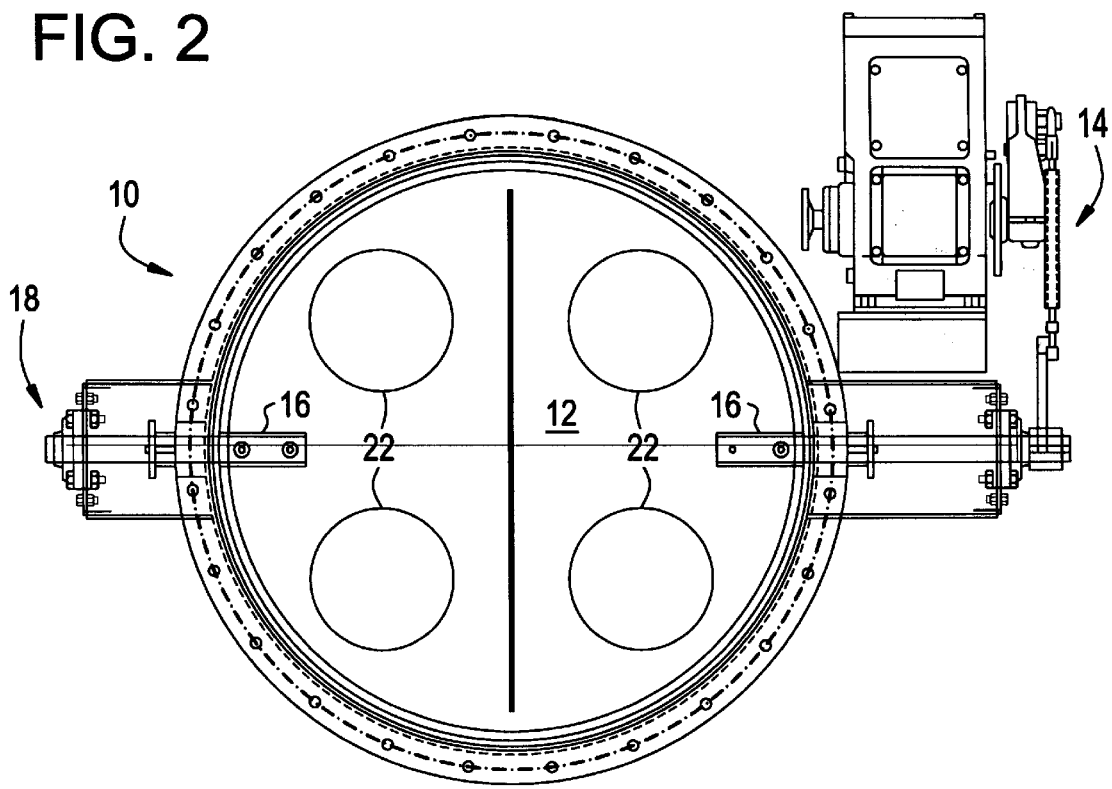
FIG. 2 is a front view of a first embodiment of the variable resistance device according to the present invention illustrating a butterfly damper having four large apertures forming a calculated open area for the desired resistance.

Referring now to FIG. 2, there is illustrated a first embodiment of the variable resistance device 10 according to the present invention. The variable resistance device 10 can be used to control the fan backpressure of the fluidized bed boiler 2 to provide pulse-free fan operation. In the particular application described above, the existing FD fan (not shown) had severe pressure pulses at lower boiler load conditions. These pulses were responsible for creating a combustion pulse in the boiler 2 that actually had enough force to excite the tube walls and buckstay system (not shown) associated with the fluidized bed boiler 2 in a "breathing" cycle that matched the pressure pulses.

The following two desired operating conditions were arrived at through on site testing. The density of the air was considered to be that of air even though under certain operating conditions flue gas is added to the air to control combustion. Since it could be possible for flue gas to leak into the air system when idle, the variable resistance device 10 was designed to have a design temperature of 350° F.

Condition 1: 200,000 lb/hr@ 180° F.; damper ΔP @ 70% open<12" water. This condition is to insure that the pressure control device does not limit full load capacity.

Condition 2: 105,000 lb/hr @ 180°F.; damper ΔP @ closed>30 "<39" water. This condition covers the low airflow case with maximum pressure drop and is intended to insure that the pressure control device has the desired range.

As illustrated in FIG. 1, if two ducts are used to provide the fluidizing air 6 to the boiler 2, two such variable resistance devices 10 would be employed to control the static pressure provided to the windbox 4 of the fluidized bed boiler 2. It will be understood that the two variable resistance devices 10 are duplicates except the one would be considered a "left hand" design and the other would be a "right hand" design, based upon the positions of any actuators 14 used on each variable resistance device 10.

Each variable resistance device 10 comprises a rotating butterfly damper 12 connected to an actuator 14 by a shaft 16 at one end and to a bearing assembly 18 at the other end. The butterfly damper 12 is sealed to the duct 8 as shown to provide zero air leakage based on a metal-to-metal seal. The actuator 14 rotates the shaft 16 to open the butterfly damper 12 to a desired angular position and resulting resistance, as needed.

As illustrated in FIG. 2, the butterfly damper is provided with a plurality of apertures 22, preferably four (4) regularly spaced holes 22, to provide for airflow 6 therethrough and a desired level of resistance even when the butterfly damper 12 is in a closed position; i.e., when the butterfly damper is substantially perpendicular to the airflow 6 through the duct 8. The open area of the butterfly damper 12 for the closed and open condition above was determined to be approximately 250 square inches. This area may be provided by four (4) regularly spaced 9-inch diameter circular holes 22 as shown in FIG. 2. Alternatively, as illustrated in FIG. 3, a plurality of smaller apertures 24, such as would be provided in a perforated plate, could be provided in the butterfly damper 12.

Figure 3:
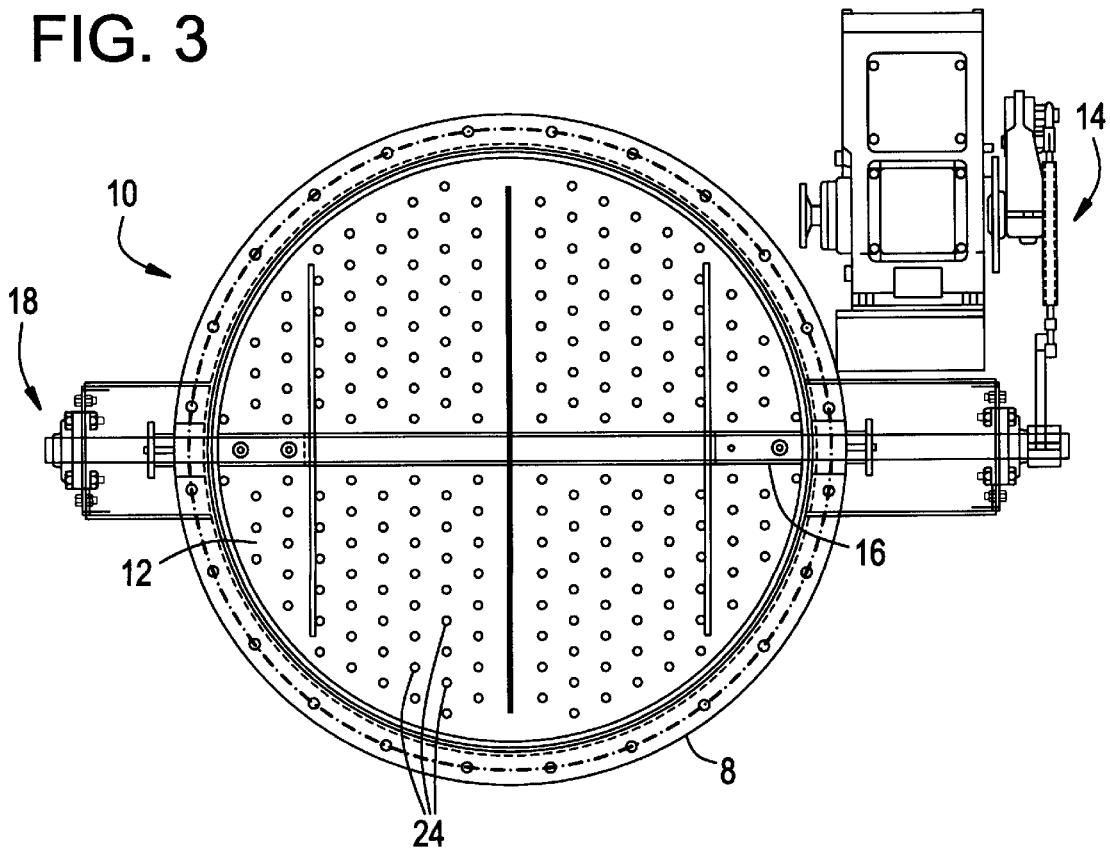
FIG. 3 is a front view of a second embodiment of the variable resistance device according to the present invention illustrating a butterfly damper having a plurality of perforations to form the calculated open area for the desired resistance.

The design criteria are seen to be met from a view of FIG. 4, which is a graph of the angular position at a constant flow vs. pressure drop thereacross for the variable resistance devices illustrated in FIGS. 2 and 3.

FIG. 4 also graphically shows the performance difference between the variable resistance device and a conventional flow damper. The variable resistance device is significantly more controllable and predictable in the desired pressure drop range of 30 to 39 inches water that was required to stabilize the fan. In fact, it was the speculation that the normal manufacturing tolerances of the damper blade control linkage could create its own pressure fluctuation of about +/−4 inches water under these conditions with a conventional flow damper that eliminated the conventional flow damper as a viable solution.

Higher static pressure fans for fluidized bed boilers are becoming more commonplace in part due to lower emission requirements and changing technology. A high static pressure fan, however, is more likely to experience instability problems when it is oversized and the typical low cost methods previously used to correct instability will not work in these fluidized bed applications. It is believed that such oversized fan problems are more prevalent than first thought; numerous bubbling fluidized bed installations have been found to report fan instability problems. In the particular application which led to the conception of the present invention, the FD fan had a much higher design flow than is typically found in such applications but still had the same high static pressure requirement that appears to be the common link in these fan instability problems. Another benefit of the present invention is the ability to stabilize low emission burner flames by stabilizing and/or fine-tuning the high static pressure combustion air FD fan. The primary advantage of the variable pressure resistance device according to the present invention is that it also offers a low cost alternative to modification or replacement of an oversized FD fan.

The variable resistance device of the present invention will easily perform the same resistance function as a stationary perforated plate or the conventional flow control damper without the mentioned limitations of either of these devices. The variable resistance device offers the variability that the stationary perforated plate lacks and also offers the stable controllability over a wider range of air flow conditions that the flow control damper lacks. The low cost of the variable resistance device also lowers the monetary risk on a short schedule project where issuing the purchase order for the fan before finalizing the design of the ductwork may be required to meet schedule. This device could also be used to reliably control and/or fine-tune the final air pressure to any particular piece of equipment that has its performance heavily dependent on the air pressure.

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving fluidized bed boilers, or to the replacement, repair or modification of existing fluidized bed boilers. The present invention can be applied to any type of air, flue gas or other gaseous supply systems requiring the introduction of a variable resistance to stabilize fan operation. In some embodiments of the invention, certain features of the invention may sometimes be used to advantage without a corresponding use of the other features. Accordingly, while certain modifications and additions have been deleted herein for the sake of conciseness and readability all such modifications and additions are properly considered to fall within the scope and equivalents of the following claims.

I claim:

1. A variable resistance device for use in a duct of a high pressure air supply system, comprising:

a rotatable butterfly damper locatable in the air supply system having a closed and an open position for variably restricting airflow through the air supply system, wherein the butterfly damper is provided with apertures which permit said airflow to flow through the butterfly damper, wherein an open area of the apertures is selected to provide a maximum resistance value at a minimum air flow rate in the closed position, a minimum resistance value at a maximum air flow rate in a 70% open position, and a nearly linear relationship between an angular rotation position of the butterfly damper and resistance.

2. The variable resistance device according to claim 1, wherein said apertures comprises a plurality of circular openings in said rotatable butterfly damper.

3. The variable resistance device according to claim 1, wherein said butterfly damper is circular.

4. The variable resistance device according to claim 1, wherein said air supply system provides air to a fluidized bed boiler.

5. A variable resistance device for use in a duct of a high pressure gas supply system, comprising:

a rotatable butterfly damper located in the gas supply system having a closed and an open position for variably restricting flow of said gas through the gas supply system, wherein the butterfly damper is provided with apertures which permit said gas to flow through the butterfly damper, wherein an open are of the apertures is selected to provide a maximum resistance value at a minimum gas flow rate in the closed position, a minimum resistance value at a maximum gas flow rate in a 70% open position, and a nearly linear relationship between an angular rotation position of the butterfly damper and resistance.

6. The variable resistance device according to claim 5, wherein said apertures comprises a plurality of circular openings in said rotatable butterfly damper.

7. The variable resistance device according to claim 5, wherein said butterfly damper is circular.

8. In combination with a fluidized bed boiler having a high pressure air supply system for providing air to said boiler, a variable resistance device for use in a duct of the high pressure air supply system, comprising:

a rotatable butterfly damper locatable in the air supply system having a closed and an open position for variably restricting airflow through the air supply system, wherein the butterfly damper is provided with apertures which permit said air to flow through the butterfly damper, wherein said apertures in the variable resistance device have an open area selected to provide a maximum resistance value at a minimum air flow rate in the closed position, a minimum resistance value at a maximum air flow rate in a 70% open position, and a nearly linear relationship between an angular rotation position of the butterfly damper and resistance.

9. The combination according to claim 8, wherein said apertures in the variable resistance device comprise a plurality of circular openings in said butterfly damper.

* * * * *